United States Patent
Fan et al.

(10) Patent No.: US 8,338,725 B2
(45) Date of Patent: Dec. 25, 2012

(54) CAMERA BASED TOUCH SYSTEM

(75) Inventors: Fu-Cheng Fan, Hsinchu (TW);
Chih-Yen Chen, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 407 days.

(21) Appl. No.: 12/770,163

(22) Filed: Apr. 29, 2010

(65) Prior Publication Data
US 2011/0266074 A1    Nov. 3, 2011

(51) Int. Cl.
G06F 3/042    (2006.01)

(52) U.S. Cl. .................................. 178/18.09; 345/175

(58) Field of Classification Search ............... 356/3–22, 356/621–623; 345/173, 175; 348/139–140
See application file for complete search history.

(56) References Cited

U.S. PATENT DOCUMENTS

| | | | |
|---|---|---|---|
| 4,507,557 A * | 3/1985 | Tsikos | 250/341.7 |
| 6,353,434 B1 * | 3/2002 | Akebi et al. | 345/173 |
| 6,438,508 B2 * | 8/2002 | Tamir et al. | 702/153 |
| 6,563,491 B1 * | 5/2003 | Omura | 345/173 |
| 6,919,880 B2 | 7/2005 | Morrison et al. | |
| 6,954,197 B2 | 10/2005 | Morrison et al. | |
| 6,972,401 B2 | 12/2005 | Akitt et al. | |
| 7,468,785 B2 * | 12/2008 | Lieberman | 356/3.14 |
| RE43,084 E * | 1/2012 | Fujioka | 345/175 |
| 2003/0006973 A1 * | 1/2003 | Omura et al. | 345/175 |
| 2005/0077452 A1 * | 4/2005 | Morrison et al. | 250/221 |
| 2005/0088424 A1 * | 4/2005 | Morrison et al. | 345/173 |
| 2005/0248539 A1 | 11/2005 | Morrison et al. | |
| 2006/0012579 A1 | 1/2006 | Sato | |
| 2006/0232792 A1 | 10/2006 | Kobayashi | |
| 2008/0013913 A1 * | 1/2008 | Lieberman et al. | 385/147 |
| 2009/0219256 A1 | 9/2009 | Newton | |
| 2010/0045629 A1 | 2/2010 | Newton | |

FOREIGN PATENT DOCUMENTS

| | | |
|---|---|---|
| EP | 1262909 A2 | 12/2002 |
| WO | 03079179 A1 | 9/2003 |
| WO | 2009102681 A2 | 8/2009 |

OTHER PUBLICATIONS

Chen Zhang et al., Tracking with Depth-from-size, Advances in Neuro-Information Processing, Nov. 25, 2008, P275-284, Springer Berlin Heidelberg, Berlin, Heidelberg.

Fei-Yue Wang et al., Stereo camera calibration without absolute world coordinate information, Jun. 14, 1995, P655-662. Proceedings of spie, Spie, US, vol. 2620.

* cited by examiner

Primary Examiner — Alexander Eisen
Assistant Examiner — Sanjiv D Patel
(74) Attorney, Agent, or Firm — Morris Manning & Martin LLP; Tim Tingkang Xia, Esq.

(57) ABSTRACT

One aspect of the present invention relates to an apparatus for touch detection. In one embodiment, the apparatus includes a touch panel, an imaging device mounted to the touch panel and configured such that when a pointer touches the touch panel, the imaging device acquires an image of the pointer touching the touch panel, and a processor in communication with the imaging device for receiving and processing the acquired image to obtain its width and its angle relative to the touch panel so as to determine the location of the pointer in the touch panel.

38 Claims, 8 Drawing Sheets

CAMERA BASED TOUCH SYSTEM

FIELD OF THE INVENTION

The present invention relates generally to touch detection, and more particularly to an optical touch detection apparatus and method of utilizing at least one image device.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

There are different types of touch sensing devices available for detection of a touch location. One is to utilize analog resistive, electromagnetic, capacitive, acoustic or machine vision techniques to identify pointer contacts on the touch panel.

Another one of camera-based touch detection systems that use optical recording devices such as cameras to acquire images of a touch surface and process the image data to determine the position of a pointer relative to the touch panel.

Conventionally, a camera-based touch system includes a touch panel and a plurality of cameras associated with the touch panel. The plurality of cameras acquires images of the touch panel from different locations and generates image data. Processing circuitry receives and processes the image data generated by the cameras to determine the location of a pointer captured in the images relative to the touch surface.

However, the use of a plurality of cameras may increase manufacturing cost and complexity.

Therefore, a heretofore unaddressed need exists in the art to address the aforementioned deficiencies and inadequacies.

SUMMARY OF THE INVENTION

The present invention, in one aspect, relates to an apparatus for touch detection. In one embodiment, the apparatus for touch detection includes a touch panel characterized with X-Y coordinates; an imaging device associated with the touch panel and configured to acquire an image of the touch panel and transfer the acquired image into a signal array that is a function of an angle; a processor in communication with the imaging device for receiving the signal array therefrom, comparing a peak signal of the signal array with a predefined threshold and if the peak signal is greater than the predefined threshold, obtaining the peak's width, W, and angle, $\Theta$, relative to the touch panel so as to determine the location (X, Y) of a pointer in the touch panel in the forms of:

$X = R \times \cos(\Theta)$, $Y = R \times \sin(\Theta)$, where R is a distance of the pointer and the imaging device, and satisfies the relationship of $W = A \times R^B + C$, where A, B and C are constant coefficients.

In one embodiment, the apparatus may further comprise a light source associated with the imaging device, and a retro-reflector disposed on the periphery of the touch panel at a location that is opposite to the pre-selected mounting position so as to reflect light emitted from the light source backward to the image device.

In one embodiment, the imaging device is calibrated by acquiring first, second and third images of a printer touching the touch panel at first, second and third pre-selected locations, $R_1$, $R_2$ and $R_3$, respectively, to establish the relationships of:

$W_1 = A \times R_1^B + C$, $W_2 = A \times R_2^B + C$, $W_3 = A \times R_3^B + C$, where $W_1$, $W_2$ and $W_3$ are the widths of the first, second and third images, respectively, and where the coefficients A, B and C are obtained by solving the equations.

To define the touch screen four corner edges, the manufacturer may be required to do the corner calibration at least once after the assembly of touch and display panel is done. The method is similar to the embodiment mentioned above; though the calibration position is at the four corners. The purpose is to do the position mapping between a touch and the display panel.

In one embodiment, the imaging device is mounted to the touch panel at a pre-selected mounting position such that the imaging device has a field of view encompassing the touch panel. In one embodiment, the imaging device comprises a camera, CCD and/or CMOS. In one embodiment, the camera comprises an infra light emitting diode (LED) camera. The imaging device is configured to acquire the image of the touch panel at a predetermined frequency In one embodiment, the processor comprises a computer, DSP, and/or microprocessor.

In another aspect, the present invention relates to a method for optically detecting a touch location in a touch panel. In one embodiment, the method includes the steps of providing an imaging device associated with the touch panel; acquiring an image of the touch panel; transferring the acquired image into a signal array that is a function of an angle; comparing a peak signal of the signal array with a predefined threshold; and if the peak signal is not greater than the predefined threshold, repeating steps (b)-(d), otherwise, obtaining the peak's width, W, and its angle, $\Theta$, relative to the touch panel so as to determine the location (X, Y) of a pointer in the touch panel in the forms of:

$X = R \times \cos(\Theta)$, $Y = R \times \sin(\Theta)$, where R is a distance of the pointer and the imaging device, and satisfies the relationship of $W = A \times R^B + C$, where A, B and C are constant coefficients.

In one embodiment, the acquiring step is performed at a predetermined frequency.

The method further includes the step of calibrating the imaging device to obtain the coefficients A, B and C. In one embodiment, the calibrating step comprises the steps of (a)

initializing a touch at a first pre-selected location, $R_1$, on the panel; (b) acquiring an image of the pointer touching the touch panel at the pre-selected location, wherein the acquired image is transferred into a signal array that is a function of an angle; (c) comparing a peak signal of the signal array with a predefined threshold; (d) if the peak signal is not greater than the predefined threshold, repeating steps (a)-(c), otherwise, obtaining the peak's width, $W_1$, and angle, $\Theta_1$, relative to the touch panel; (e) repeating steps (a)-(d) at the second and third pre-selected locations, $R_2$ and $R_3$ to obtain $W_2$ and $\Theta_2$, and $W_3$ and $\Theta_3$, respectively; and solving the following equations:

$$W_1 = A \times R_1^B + C,$$

$$W_2 = A \times R_2^B + C,$$

$$W_3 = A \times R_3^B + C; \text{ and}$$

solving the equations to obtain the coefficients A, B and C.

In one embodiment, the method also includes the steps of providing a light source associated with the imaging device; and providing a retro-reflector disposed on the periphery of the touch panel at a location that is opposite to the pre-selected mounting position so as to reflect light emitted from the light source backward to the image device.

In one embodiment, the imaging device is mounted to the touch panel at a pre-selected mounting position such that the imaging device has a field of view encompassing the touch panel, where the pre-selected mounting position is located in the periphery of the touch panel. In one embodiment, the imaging device comprises a camera, CCD and/or CMOS. The camera comprises an infra LED camera.

In yet another aspect, the present invention relates to an apparatus for detecting touch locations of first and second pointers in a touch panel. In one embodiment, the apparatus has at least first and second imaging devices spatially mounted to the touch panel. Each imaging device is configured to acquire an image of the touch panel, and transfer the acquired image into a corresponding signal array that is a function of an angle. In one embodiment, each of the first and second imaging devices is configured to acquire the image of the touch panel at a predetermined frequency In one embodiment, each of the first and second imaging devices is calibrated by acquiring first, second and third images of a printer touching the touch panel at first, second and third pre-selected locations, $R_1$, $R_2$ and $R_3$, respectively, to establish the relationships of:

$$W_1 = A_j \times R_1^{Bj} + C_j,$$

$$W_2 = A_j \times R_2^{Bj} + C_j,$$

$$W_3 = A_j \times R_3^{Bj} + C_j,$$

where $W_1$, $W_2$ and $W_3$ are the widths of the first, second and third images, respectively, and where the coefficients $A_j$, $B_j$ and $C_j$ are obtained by solving the equations, where j=1 for the first imaging device and j=2 for the second imaging device.

The first and second imaging devices, in one embodiment, are mounted to the touch panel at pre-selected first and second mounting positions, respectively, such that the first and second imaging devices have overlapping fields of view encompassing the touch panel, where the pre-selected first and second mounting positions are located in the periphery of the touch panel.

In one embodiment, each of the first and second imaging devices comprises a camera. The camera comprises an infra LED camera.

The apparatus further has a processor in communication with each imaging device for receiving the corresponding signal arrays therefrom, comparing each peak signal of each signal array with a predefined threshold and if the peak signals are greater than the predefined threshold, obtaining the maximal widths, $W_1$ and $W_2$, and its corresponding angles, $\Theta_1$ and $\Theta_2$, of the signal arrays corresponding to the first and second images, respectively, so as to determine touch locations (X1, Y1) and (X2, Y2) of the first and second pointers, respectively, in the touch panel in the forms of:

$$X1 = R1 \times \cos(\Theta_1),$$

$$Y1 = R1 \times \sin(\Theta_1),$$

$$X2 = D - [R2 \times \cos(\Theta_2)],$$

$$Y2 = R2 \times \sin(\Theta_2),$$

where D is a distance between the first and second imaging devices, and where Rj is a distance between the j-th pointer and the j-th imaging device, j=1 and 2, and satisfies the relationship of $$W_j = A_j \times Rj^{Bj} + C_j,$$

where $A_j$, $B_j$ and $C_j$ are constant coefficients.

In one embodiment, the processor comprises a computer.

In one embodiment, the apparatus may further have first and second light sources associated with the first and second imaging devices, respectively, and a retro-reflector disposed on the periphery of the touch panel at a location that is opposite to the pre-selected first and second mounting position so as to reflect light emitted from the first and second light sources backward to the first and second image devices, respectively.

In a further aspect, the present invention relates to a method for optically detecting one or more touch locations in a touch panel. In one embodiment, the method includes the following steps:

(a) providing first and second imaging devices spatially mounted to the touch panel;

(b) acquiring a first image and a second image of the touch panel by the first and second imaging devices, respectively;

(c) transferring the acquired first image into a first signal array that is a function of an angle;

(d) comparing each peak signal of the first signal array with a predefined threshold;

(e) if the peak signal is greater than the predefined threshold, analyzing the peak number of the first signal array and obtaining the maximal width, Wj, and its corresponding angle, $\Theta j$;

(f) determining the location (Xj, Yj) of the first pointer in the touch panel in the forms of:

$$X1 = R1 \times \cos(\Theta_1),$$

$$Y1 = R1 \times \sin(\Theta_1),$$

wherein R1 is a distance of the first pointer and the first imaging device and satisfies the relationship of $$Wj = A_j \times Rj^{Bj} + C_j,$$

wherein $A_j$, $B_j$ and $C_j$ are constant coefficients, wherein j=1;

(g) reporting the touch position of the first pointer; and (h) repeating steps (c)-(g) for the acquired second image, wherein j=2.

In one embodiment, the acquiring step is performed at a predetermined frequency.

The method further includes the step of calibrating respectively the first and second imaging devices so as to obtain the coefficients $A_j$, $B_j$ and $C_j$. In one embodiment, the calibrating step comprises the steps of acquiring first, second and third images of a pointer touching the touch panel at first, second and third pre-selected locations, $R_1$, $R_2$ and $R_3$, respectively, by the j-th imaging device, j=1 or 2; obtaining widths, $W_1$, $W_2$ and $W_3$, of the first, second and third images, respectively, which satisfy the equations of:

$$W_1 = A_j \times R_1^{B_j} + C_j,$$

$$W_2 = A_j \times R_2^{B_j} + C_j,$$

$$W_3 = A_j \times R_3^{B_j} + C_j;\ \text{and}$$

solving the equations to obtain the coefficients $A_j$, $B_j$ and $C_j$.

In one embodiment, the method also includes the steps of providing first and second light sources associated with the first and second imaging devices, respectively, and providing a retro-reflector disposed on the periphery of the touch panel at a location that is opposite to the pre-selected first and second mounting position so as to reflect light emitted from the first and second light sources backward to the first and second image devices, respectively.

In one embodiment, the first and second imaging devices are mounted to the touch panel at pre-selected first and second mounting positions, respectively, such that the first and second imaging devices have overlapping fields of view encompassing the touch panel. The pre-selected first and second mounting positions are located in the periphery of the touch panel. In one embodiment, each of the first and second imaging devices comprises a camera, CCD and/or CMOS. The camera includes an infra LED camera.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
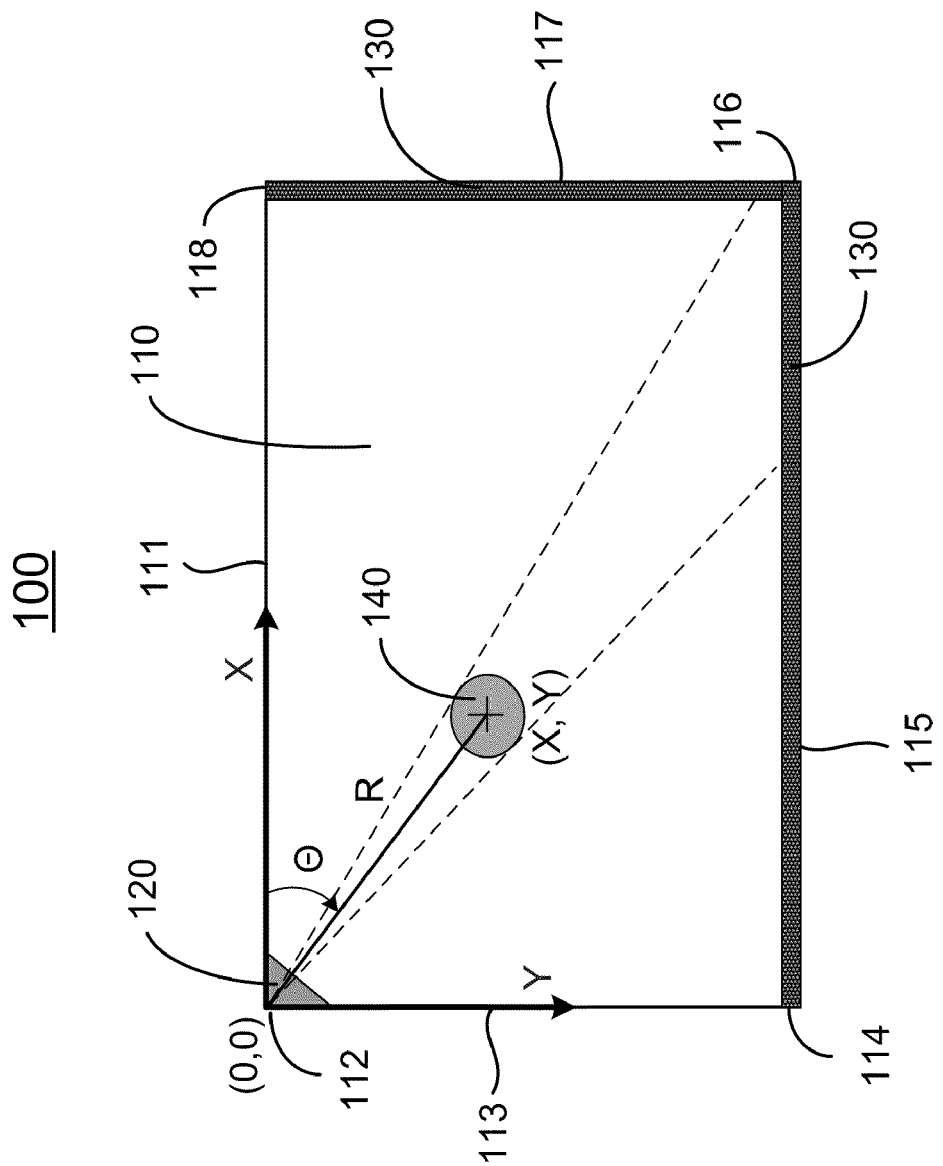
FIG. 1 shows schematically an apparatus for touch detection according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention, in one aspect, relates to an apparatus and method for touch detection.

Referring now to FIG. 1, an apparatus 100 for touch detection is shown according to one embodiment of the present invention. In this embodiment, the apparatus 100 includes a touch panel 110, an imaging device 120 and a processor (not shown). Generally, the touch panel 110 is a rectangular or square panel having four sides 111, 113, 115 and 117 defining four corners 112, 114, 116 and 118. The touch panel 110 is characterized with X-Y coordinates with the coordinate origin (0, 0) at the corner 112. Other geometric shapes of the touch panel 110 can also be utilized to practice the present invention.

The imaging device 120 is mounted to the touch panel 110 at a pre-selected mounting position such that the imaging device has a field of view encompassing the touch panel. In this exemplary embodiment, the imaging device 120 is mounted at the corner 112, i.e., the coordinate origin (0, 0) of the X-Y coordinates, of the touch panel 110.

The imaging device 120 is configured to acquire an image of the (cross-section view) touch panel at a pre-determined frequency, for example, at 60 Hz, and to transfer/map the acquired image into a signal array that is a function of an angle relative to the touch panel 110. Usually, the angle is from 0° to 100°, at least larger than 90°. The imaging device 120 captures two dimension information, e.g., X=the horizontal direction, Y=the vertical direction. Once the image is captured, an array of the X direction for a predefined Y position is selected for touch position analysis. The image is a 2D array of the received light intensity, a horizontal array is selected at a predefined vertical position, and the conversion of the image to raw data array can be performed only on the selected horizontal array to have faster response time. The processor is in communication with the imaging device 120 for receiving the signal array therefrom and comparing a peak signal of the signal array with a predefined threshold. In one embodiment, a baseline array needs to be used in this process. The baseline array, for example, is a calculation of moving average of raw data array when this frame is regarded as non-touch situation. For the touch case, the baseline will not be updated. The difference array is obtained by subtracting the current raw data and the baseline. The peak of the difference array is found and compare with a predefined threshold. For such a design, when an object touches the panel, what camera sees is a decrease signal at the corresponding position/angle. The difference value is used to find the peak. For every angle, the difference value is obtained by subtracting baseline to the current raw value by camera. When all the difference value of every angle is less than the predefined value, this current is regarded as background and being an updated data of the moving average to be the baseline. The baseline is to decrease the interference of the environment. If the peak signal is greater than the predefined threshold, obtaining the peak's width, W, which can be full width half maximum, or 1/e of the maximum value, and angle, Θ, so as to determine the location (X, Y) of a pointer 140 in the touch panel 110 in the forms of:

$$X = R \times \cos(\Theta),$$

$$Y = R \times \sin(\Theta),$$

where R is a distance of the pointer 140 and the imaging device 120, and satisfies the relationship of $$W = A \times R^B + C,$$

where A, B and C are constant coefficients.

Additionally, the above fitting equation for the relationship between W and R can also be in other forms, for example, $$R = a \times W^b + c,$$

where constant coefficients, a, b and c can be obtained by calibration of the apparatus.

The imaging device 120 includes a camera, CCD and/or CMOS. Preferably, the camera is an infra LED camera. Other types of the imaging device 120 can also be utilized to practice the present invention. The pointer 140 can be a finger or any other object with the surface or material that can block or scatter or absorbed the IR light. In one embodiment, the processor comprises a computer, and/or controller.

Further, the apparatus 100 may have a light source (not shown) associated with or integrated to the imaging device 120, and a retro-reflector 130 disposed on the periphery of the touch panel 110, for example, at the sides 115 and 117 that are opposite to the pre-selected mounting position, i.e., the corner 112 of the touch panel 110, where the imaging device 120 is mounted. The retro-reflector 130 is adapted for reflecting light emitted from the light source backward to the image device 120, so as to capture the image of the pointer when it touches the touch panel 110 and compare it with the baseline image to find out the touch events. All the light emitted from the imaging device 120 is floating over the touch panel 110. For such a configuration, when the light emitted from the light source is shaded by a pointer 140, such as a finger or any other object, the light received by the imaging device 120 is decreased at a certain angle, Θ, relative to the X-axis, which corresponds to the touch position on the touch panel 110. Accordingly, the captured image contains information of the touch position of the pointer 140 on the touch panel 110.

Figure 2:
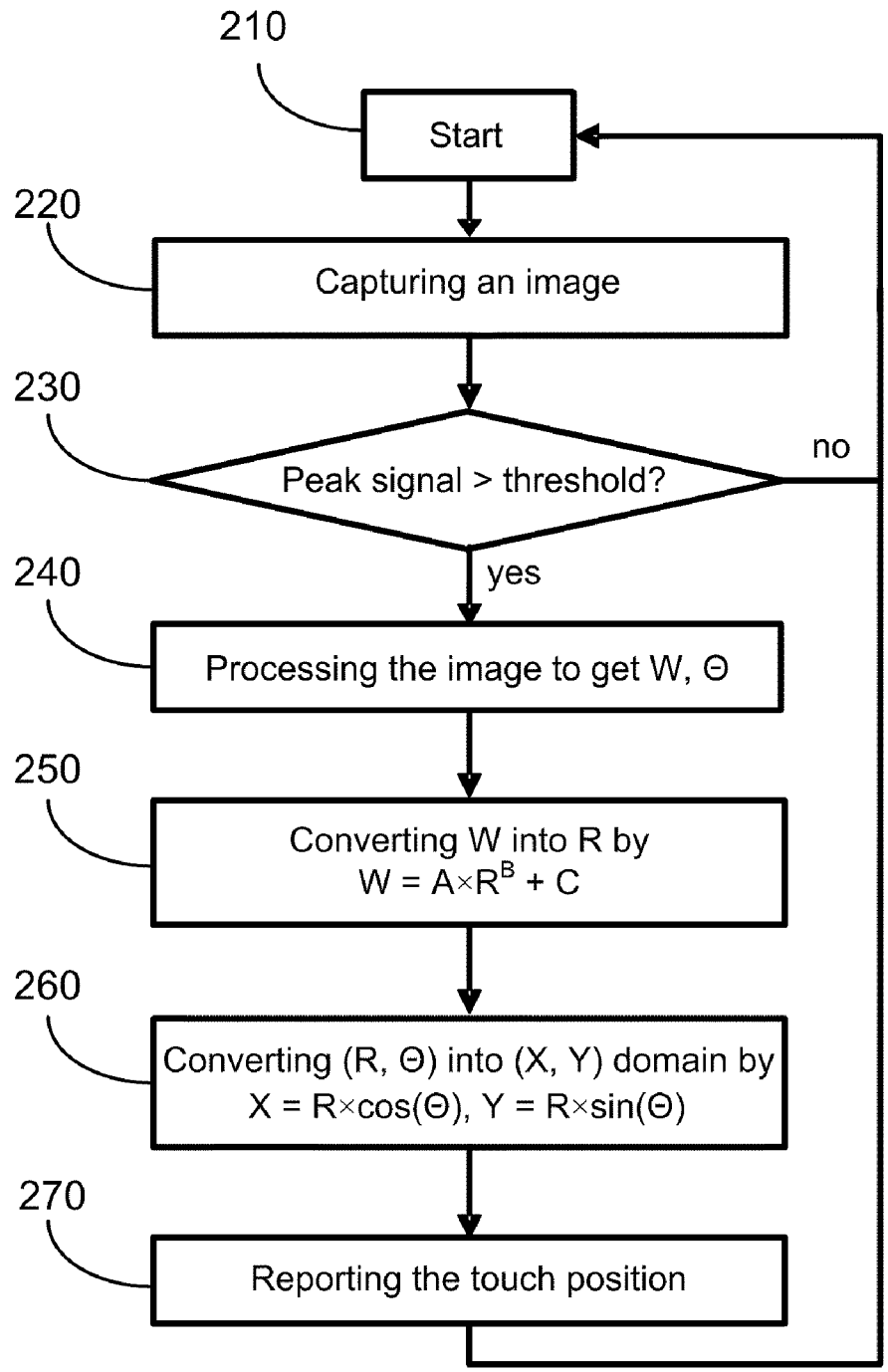
FIG. 2 shows a flowchart for touch detection according to one embodiment of the present invention.

FIG. 2 shows a flowchart of detecting a touch position of a pointer by the apparatus 100 according to one embodiment of the present invention. According to the present invention, the trigger of touch position calculation is based on comparing the peak signal and a predefined threshold. The image (touch sensing device) is looping to an acquire image at a predetermined frequency, e.g., 60 Hz. When an image is acquired by the image device, the acquired image is transformed or mapped into a signal array which is function of an angle. The peak signal of the signal array is checked, if the peak signal is larger than the predefined threshold, the processor starts to process the signal array to obtain its width and angle, and then determine the touch position.

Specifically, at step 210, the apparatus is set to start, and the camera (the imaging device) captures an image of the touch panel at step 220. The acquired image is transformed or mapped into a signal array that is a function of an angle. The captured image contains information of the touch position of the pointer on the touch panel, such as the angle Θ defined between the direction from the camera, i.e., the coordinate origin (0, 0), to the touch position and the X-axis, and the distance, R, between the camera and the touch position of the pointer. The captured image can be in any format, such as jpg, bitmap, tiff, etc.

The image device is configured to capture the image of the touch panel at a frequency.

At step 230, the processor compares the peak signal of the signal array with a predefined threshold. If the peak signal is not greater than the predefined threshold, the processor will process the next image (signal array). Otherwise, the processor processes the image to obtains the peak's bandwidth, W, and angle, Θ, relative to the touch panel at step 240. Then, at step 250, the processor converts the peak's width W into the distance R between the camera and the touch position of the pointer in the form of:

$$W = A \times R^B + C,$$

where A, B and C are constant coefficients which are determined by calibration of the pointer to the camera as disclosed below.

At step 260, the processor converts the polar coordinate (R, Θ) of the touch position of the pointer into the Cartesian coordinate (X, Y) by $$X = R \times \cos(\Theta),$$

$$Y = R \times \sin(\Theta).$$

Accordingly, the detected touch position (X, Y) of the pointer on the touch panel is reported or displayed at step 270. Then, the apparatus is ready to detect the touch position of the next touching event.

Figure 3:
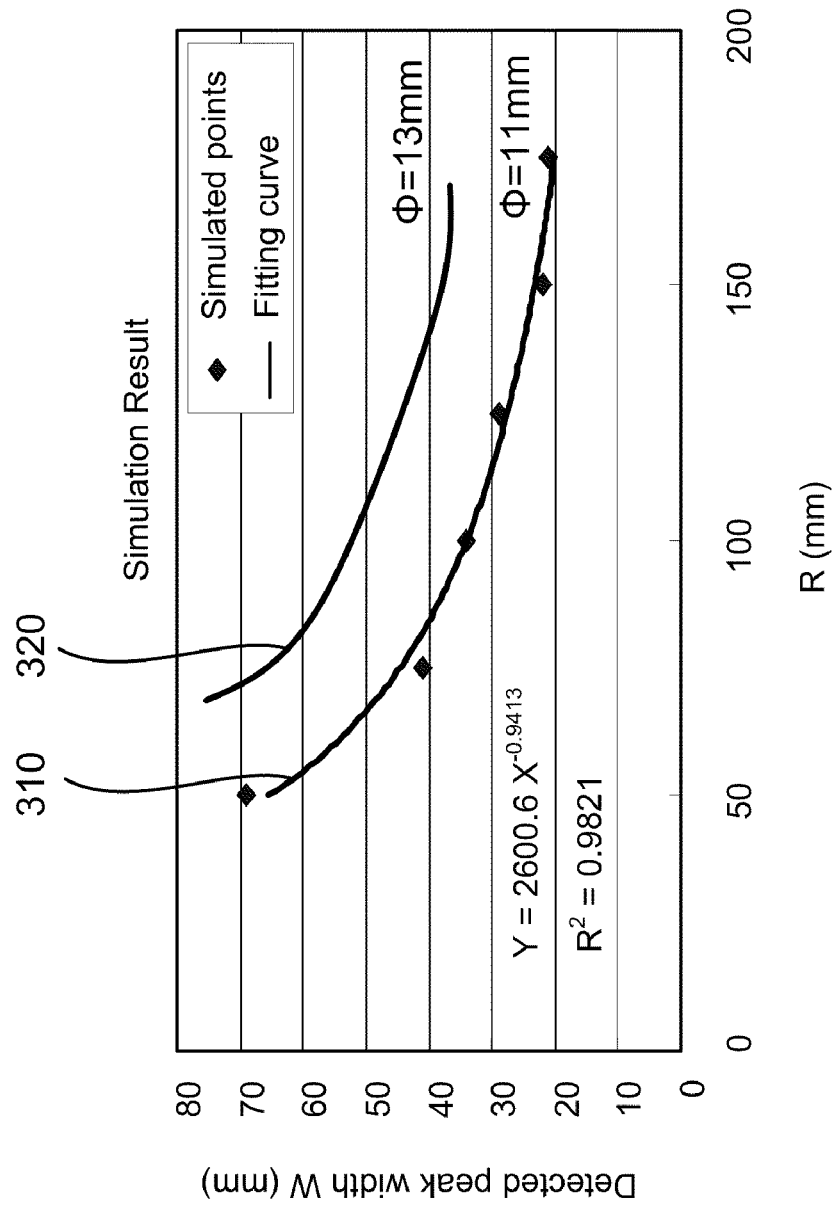
FIG. 3 shows simulation results of the apparatus for touch detection according to the embodiment of FIG. 1.

FIG. 3 shows simulation results of the relationship of W and R for two different sized pointers in the touch position detection. Curves 310 and 320 are the fitting curves corresponding to the pointers having diameters Φ=11 mm and 13 mm, respectively. Once the peak width W of a captured image of a corresponding pointer is obtained, the distance R of the corresponding pointer to the camera can be obtained from the corresponding fitting curve 310 or 320.

Figure 4:
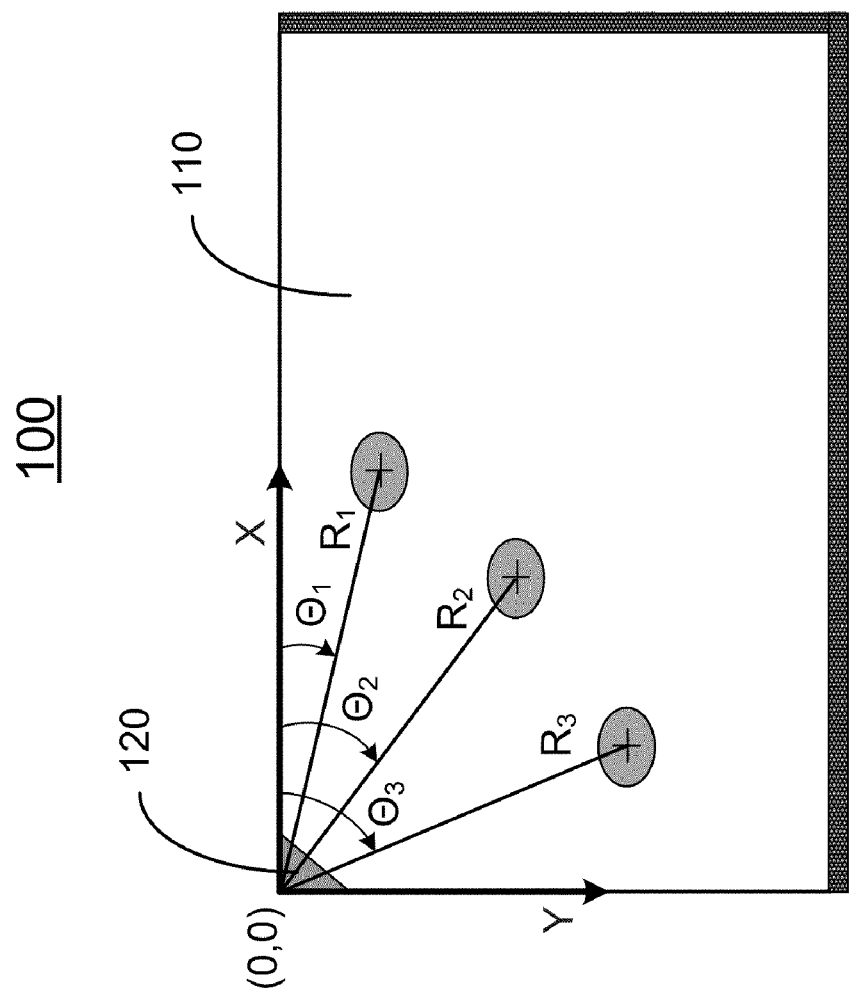
FIG. 4 shows schematically calibration of a pointer to the camera of the apparatus according to one embodiment of FIG. 1.
Figure 5:
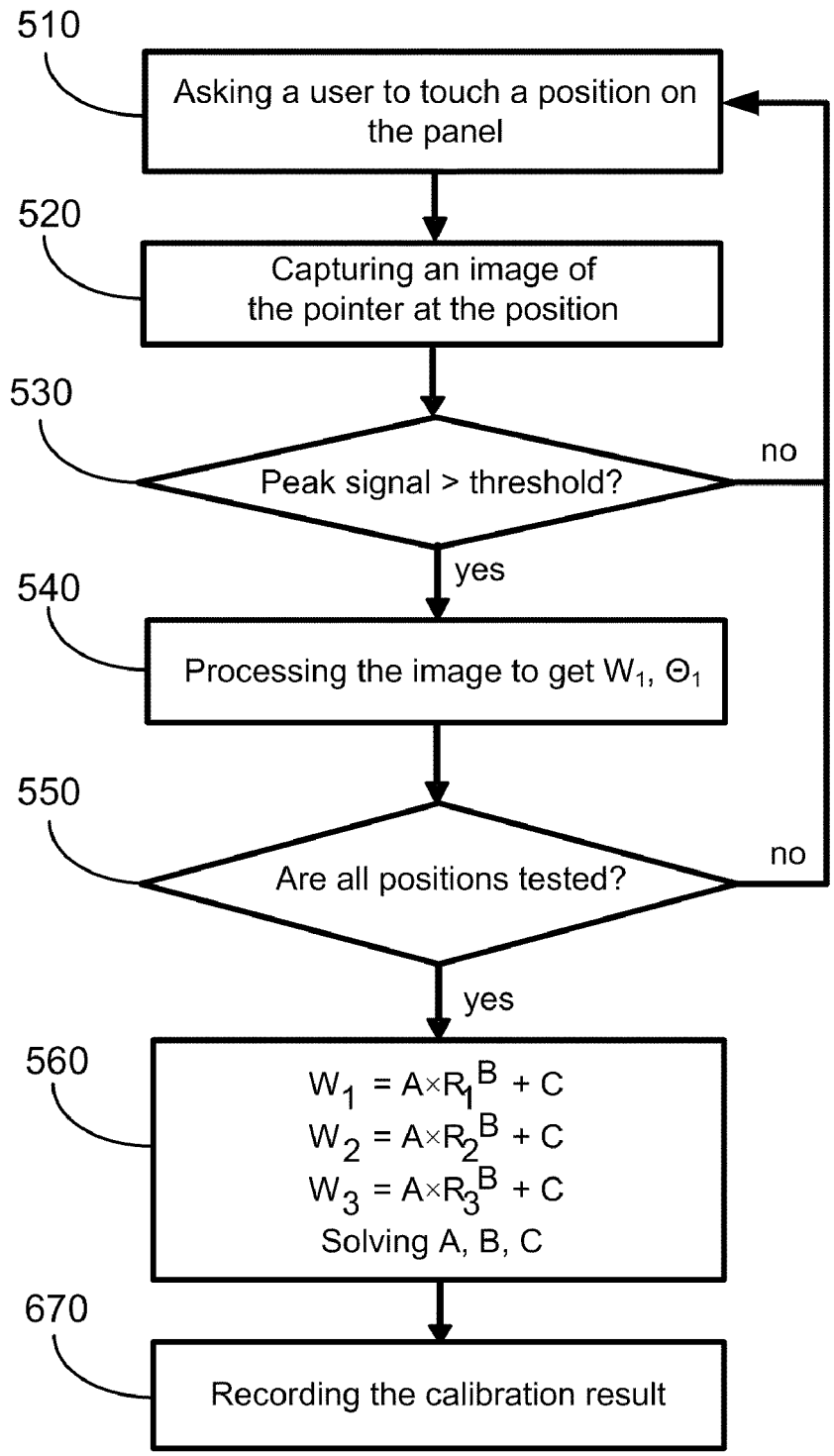
FIG. 5 shows a flowchart for calibration of the pointer to the camera of the apparatus according to the embodiment of FIG. 1.

FIGS. 4 and 5 illustrate schematically the calibration of a pointer to the camera 120 for the apparatus 100 shown in FIG. 1. As disclosed above, the camera 120 is looping to an acquire image of the display panel at a predetermined frequency, e.g., 60 Hz, and the acquired image is transferred into a signal array that is a function of an angle relative to the display panel.

In this exemplary embodiment, the calibration process is performed by the following steps: at step 510, a touch of the pointer at a first pre-selected position, $R_1$, of the touch panel 110 is performed. Meanwhile, the camera 120 captures the first image of the pointer at step 520. At step 530, the processor compares the peak signal of the signal array with a predefined threshold. If the peak signal is not greater than the predefined threshold, the user is asked to re-touch the panel, and the processor processes the acquired image in the same way. If the peak signal is greater than the predefined threshold, the processor analyzes the image to obtain the peak's width, $W_1$, and angle, $\Theta_1$, relative to the touch panel at step 540. Then steps 510-530 are repeated for the second and third touches of the pointer at the second and third pre-selected positions, $R_2$ and $R_3$, so as to obtain the corresponding $W_2, \Theta_2$ and $W_3, \Theta_3$, respectively. At step 550, the processor checks if all three pre-selected positions $R_1$, $R_2$ and $R_3$ have been tested. If not, repeating the processes of steps 510-540 until all three pre-selected positions $R_1$, $R_2$ and $R_3$ have been tested. If yes, the processor solves the relationships of $R_1$, $R_2$ and $R_3$, and $W_1$, $W_2$ and $W_3$ (at step 560), which are in the forms of $$W_1 = A \times R_1^B + C,$$

$$W_2 = A \times R_2^B + C,$$

$$W_3 = A \times R_3^B + C.$$

Then, the coefficients A, B and C are obtained by solving the equations. The calibration result is reported/recorded at step 570.

Alternatively, the calibration process may be performed by acquiring first, second and third images of the printer touching the touch panel at first, second and third pre-selected locations, $R_1$, $R_2$ and $R_3$, respectively, and processing each acquired image to obtain the corresponding peak width W and angle $\Theta_j$, j=1, 2 and 3, which Rj and Wj satisfy the equation:

$$W_j = A \times R_j^B + C,$$

and solving the equations (j=1, 2 and 3) to obtain the coefficients A, B and C.

Figure 6:
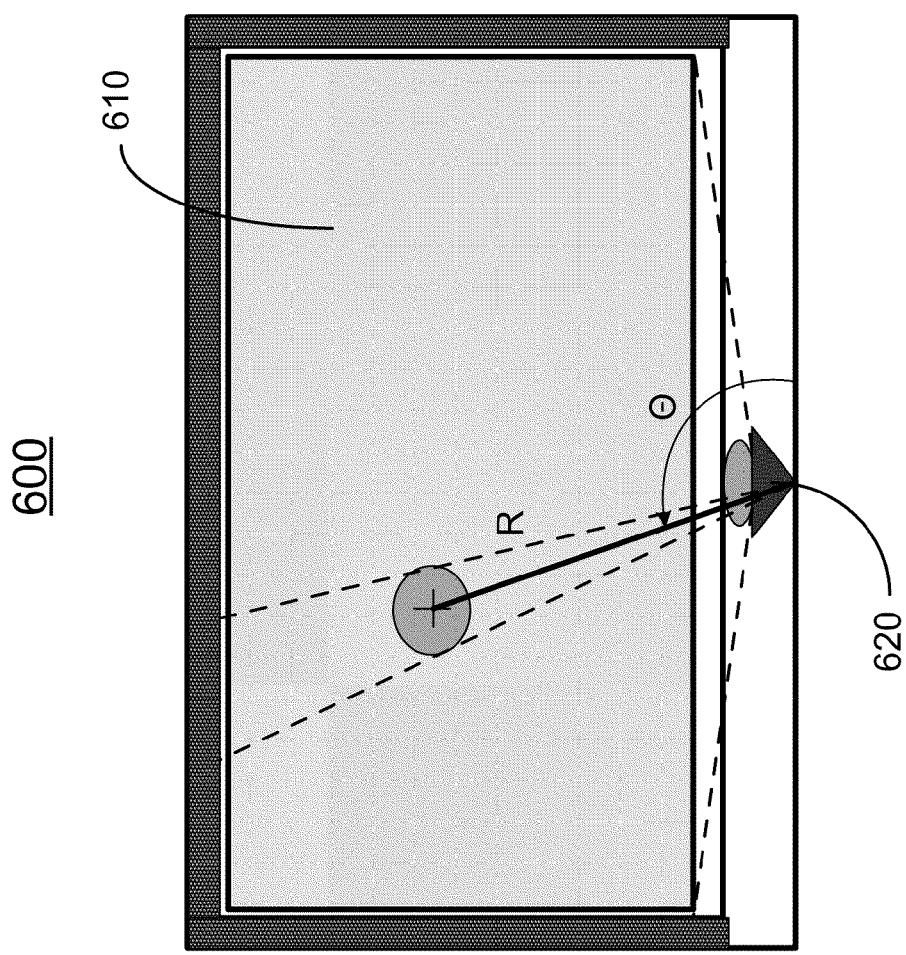
FIG. 6 shows schematically an apparatus for touch detection according to another embodiment of the present invention.

FIG. 6 shows schematically an apparatus 600 for touch detection according to another embodiment of the present invention. In this embodiment, the camera 620 is deposed at the middle of the bottom side of the touch panel 610. By applying the above disclosed algorithm, a touch position of a pointer on the touch panel 610 can be detected by the single camera 620.

Further, such an arrangement of the camera 620 in the bottom side of the touch panel 610 may improve the effective touch area of the touch panel 620, since the bottom portion of the touch panel 610 is usually reserved for the placement of control electronics, and the placement of the camera 620 needs no extra space of the touch panel 610.

Figure 7:
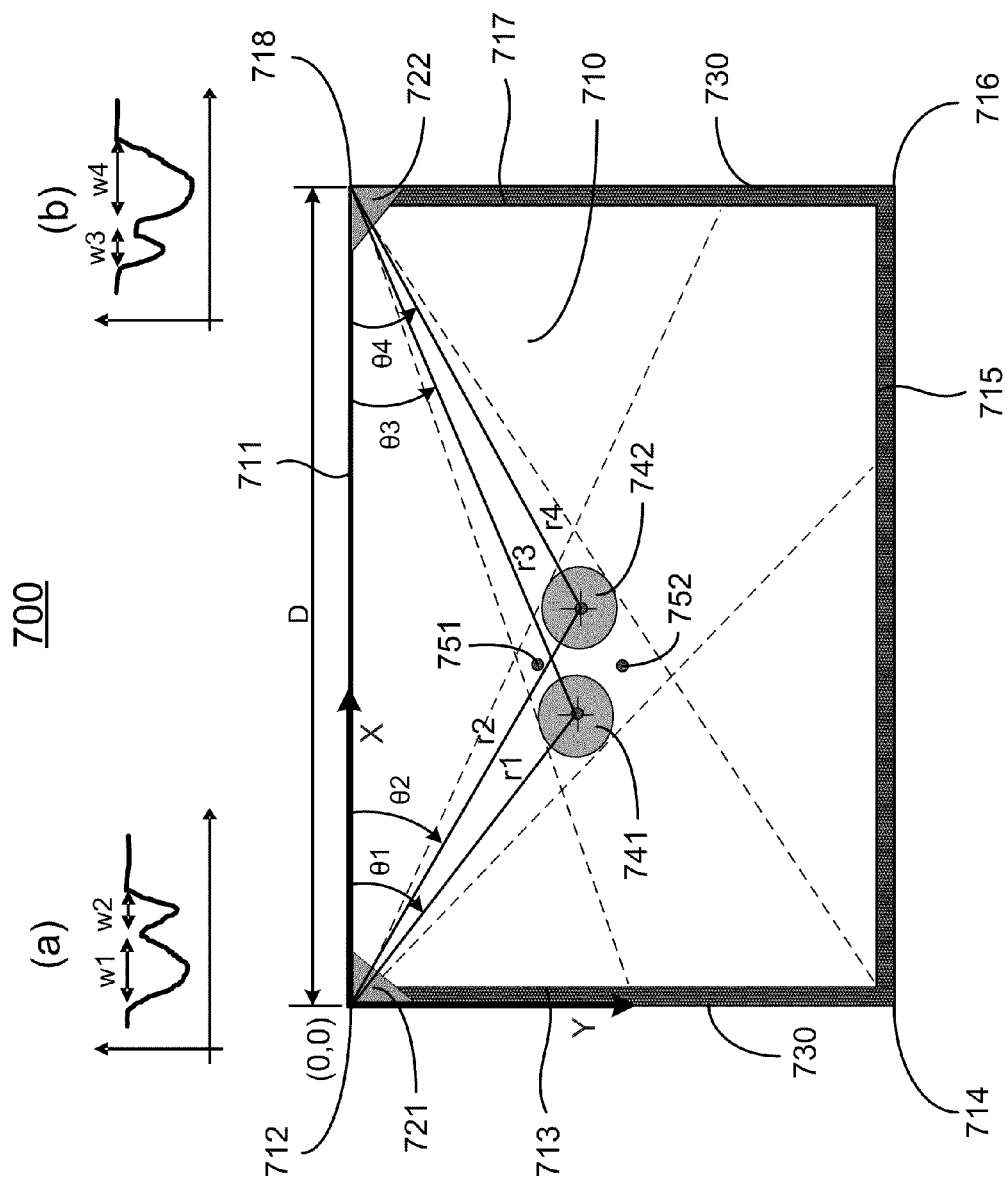
FIG. 7 shows schematically an apparatus for touch detection according to yet another embodiment of the present invention.

Referring to FIG. 7, an apparatus 700 for detecting touch locations of first and second pointers in a touch panel 710 is shown according to one embodiment of the present invention. Generally, the touch panel 710 is a rectangular or square panel having four sides 711, 713, 715 and 717 defining four corners 712, 714, 716 and 718. The touch panel 710 is characterized with X-Y coordinates with the coordinate origin (0, 0) at the corner 712. Other geometric shapes of the touch panel 710 can also be utilized to practice the present invention.

In this embodiment, the apparatus 700 includes first and second cameras (imaging devices) 721 and 722 and a processor (not shown). The first camera 721 is mounted to the first corner 712, i.e., the coordinate origin (0, 0) of the X-Y coordinates, of the touch panel 710, while the second camera 722 is mounted to the second corner 718 of the touch panel 710. Accordingly, the first and second cameras 721 and 722 are separated by a distance of D that is the width of the touch panel 710.

Further, the apparatus 700 may have one or more light sources (not shown) associated with or integrated to the first and second cameras 721 and 722, and a retro-reflector 730 disposed on the periphery of the touch panel 710, for example, at the sides 713, 715 and 717 that are opposite to the first and second corners 712 and 718 of the touch panel 710, where the first and second cameras 721 and 722 are mounted. The retro-reflector 730 is adapted for reflecting light emitted from the one or more light source backward to the first and second cameras 721 and 722, so as to capture the images of the first and/or second pointers when they touch the touch panel 710. All the light emitted from the one or more light sources is floating over the touch panel 710. For such a configuration, when the emitted light is shaded by the first and/or second pointers 741 and 742, such as fingers or any other objects, the light received by the first camera 721 is decreased at contain angles, θ1 and θ2, while the light received by the second camera 722 is decreased at contain angles, θ3 and θ4. Accordingly, the captured images contain information of the touch positions of the first and/or second pointers 741 and 742 on the touch panel 710.

Each of the first and second cameras 721 and 722 is configured to capture an image of the touch panel 711 at a predetermined frequency, for example, 60 Hz, and to transfer the acquired image into a corresponding signal array that is a function of an angle. Thus, when the first pointer 741 and/or the second pointer 742 touch the touch panel 711, one of the images acquired by the first camera 721 contains the position information of the first pointer 741 and/or the second pointer 742, and one of images acquired by the second camera 722 also contains the position information of the first pointer 741 and/or the second pointer 742. By processing these images captured by both the first and second cameras 721 and 722, the positions of the first pointer 741 and/or the second pointer 742 can be determined.

The processor is in communication with the imaging device for receiving and processing the acquired/captured images of the touch panel 711 so as to determine the touch positions of the first pointer 741 and/or the second pointer 742 therefrom. Specifically, the processor analyzes each image acquired by the first camera 721. If no peak signal is greater than a pre-determined threshold, it processes the next acquired image. Otherwise, it analyses the peak number of the image data and obtain peak widths w1 and w2, and corresponding angles, θ1 and θ2. The maximal peak width of the two peak widths w1 and w2 will be used to determine the distance between the first camera 721 and the first pointer 741. For example, as shown in FIG. 7(a), the maximal peak width is w1, and corresponding angle is θ1. Then, the processor converts the polar coordinate (r1, θ1) of the touch position of the pointer into the Cartesian coordinate (X, Y), and reports the touch position R1=r1 of the first pointer 741. Repeating the above processes for the images captured by the second camera 422 determines the touch position R2 of the second pointer 742.

For example, as shown in FIG. 7(a), the image acquired by the first camera 721 has two peaks with widths w1 and w2, which correspond to the first pointer 741 and the second pointer 742, respectively. The larger width $W_1=\text{Max}\{w1, w2\}=w1$ is used to obtain the touch position of the first pointer 741. As shown in FIG. 7(b), the image acquired by the second camera 722 has two peaks with widths w3 and w4, which correspond to the first pointer 741 and the second pointer 742, respectively. The larger width w1 (>w2) is used to obtain the touch position of the first pointer 741, while the larger width w4 (>w3) is used to obtain the touch position of the second pointer 741.

For such an arrangement of two cameras 721 and 721, shown in FIG. 7, the issues of ghost points 751 and 752 associated with the prior art are solved.

Figure 8:
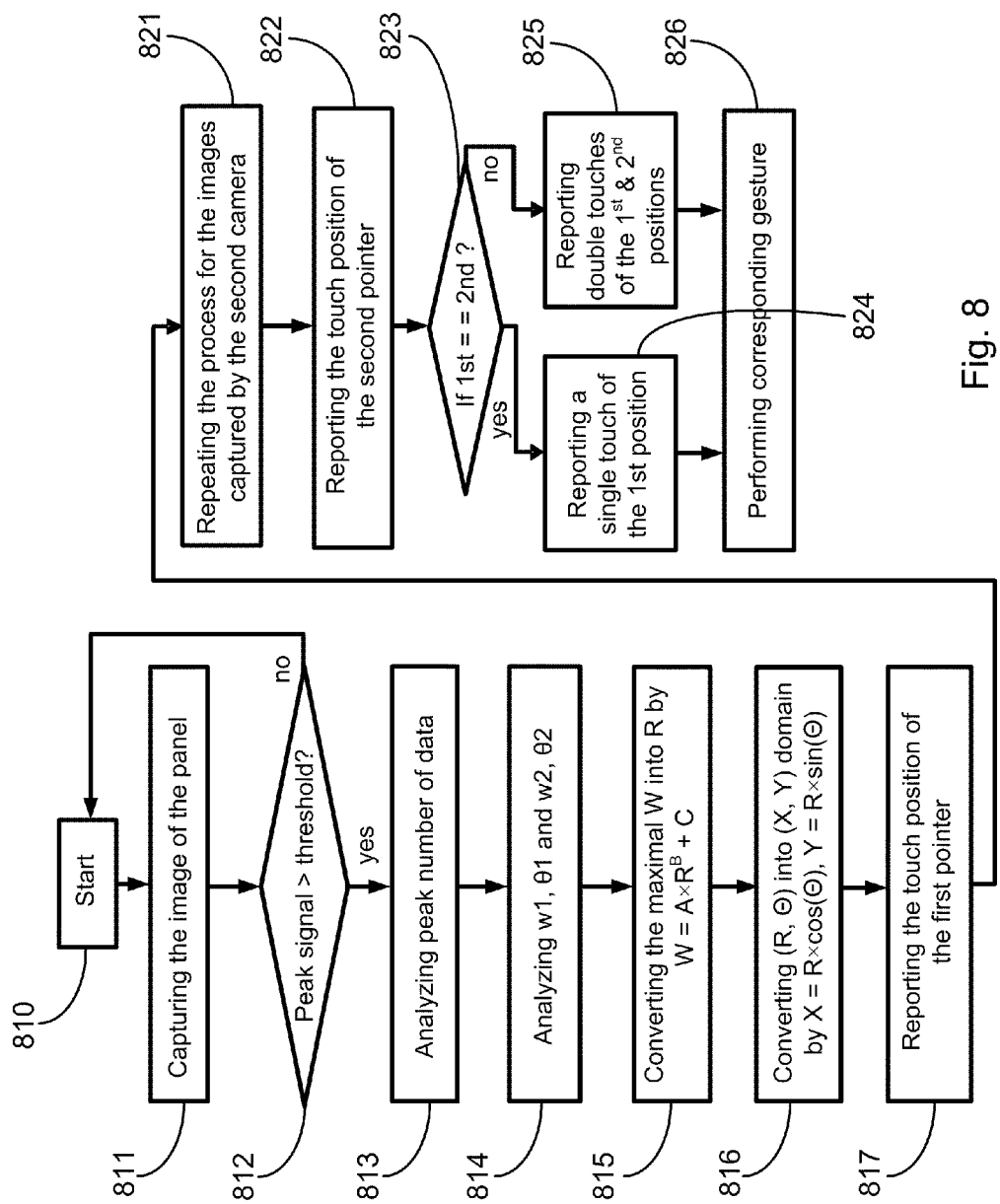
FIG. 8 shows a flowchart for touch detection according to one embodiment of the present invention.

FIG. 8 shows a flowchart of detecting a touch position of a pointer by the apparatus 100 according to the embodiment of the apparatus shown in FIG. 7.

At step 810, the apparatus is set to start detecting touch positions of the first and/or second pointers on the touch panel of the apparatus. For example, the first and second cameras capture images of the touch panel at step 811. The captured images are transferred into corresponding signal arrays mapped on the touch panel. When the first pointer and/or the second pointer touch the touch panel, at least one of these captured images acquired by the first camera and at least one of these images acquired by the second camera contain information of the touch positions of the first and/or second pointers on the touch panel.

At step 812, the processor compares the peak signals of the signal array transferred from an image captured by the first camera with a pre-determined threshold. If no peak signal is found to be greater than a pre-determined threshold, the processor will processes the signal array transferred from the next acquired image. Otherwise, it analyses the peak number of the image data at step 813, and obtains peak widths w1 and w2, and corresponding angles, θ1 and θ2 at step 814. The maximal peak width W of the two peak widths w1 and w2 is used to determine the distance R=r1 between the first camera and the first pointer, which is in the form of $$W = A \times R^B + C,$$

where W=Max{w1, w2}, and A, B and C are constant coefficients, which are determined by calibration of the pointer to the camera.

At step 815, the processor converts the polar coordinate (R, Θ) of the touch position of the pointer into the Cartesian coordinate (X, Y) by $$X = R \times \cos(\Theta),$$

$$Y = R \times \sin(\Theta),$$

where Θ is corresponding to the angle of the peak signal having the maximal width W. For example, for the bandwidths shown in FIG. 7(a), W=w1, and thus, Θ=θ1 and R=r1. Accordingly, the detected touch position (X, Y) of the pointer on the touch panel is reported or displayed at step 816. If the maximal peak width W=w1, the distance of R corresponds to r1, the distance between the first camera and the first pointer, and the reported first touch position is corresponding to the touch position of the first pointer. Otherwise, the distance of R corresponds to r2, the distance between the first camera and the second pointer, and the reported first touch position is corresponding to the touch position of the second pointer, if W=w2.

The above processes 812-816 are repeated for the images captured by the second camera to get the touch position of the other of the first and second pointers at step 821. For example, the processor first analyzes the images acquired by the second camera to get the peak widths, w3 and w4, and the corresponding angles θ3 and θ4. Then, the processor converts the maximal width W=max{w3, w4} of the second image into the distance R between the second camera and the touch position of one of the first and second pointers in the form of $$W = A \times R^B + C.$$

If the maximal peak width W=w3, the distance of R corresponds to r3, the distance between the second camera and the first pointer, and the reported second touch position is corresponding to the touch position of the first pointer. Otherwise, the distance of R corresponds to r4, the distance between the second camera and the second pointer, and the reported second touch position is corresponding to the touch position of the second pointer, if W=w4.

The processor converts the polar coordinate (R, Θ) of the touch position of the pointer into the Cartesian coordinate (X, Y) by $$X = D - [R \times \cos(\Theta)],$$

$$Y = R \times \sin(\Theta),$$

where Θ is corresponding to the angle of the peak signal having the maximal width W. For example, for the widths shown in FIG. 7(b), W=w4, and Θ=θ4 and R=r4. The obtained touch position is reported at step 822. Then the processor compares these results at step 823. If the first reported touch position and the second reported touch position are identical, or the difference is less that a pre-defined distance, e.g: less than about 1 mm, only one touch position is reported at step 824. Otherwise, the first and second positions are reported at step 825. The former corresponds to a single touch, and the latter corresponds to the double touches. The apparatus will then perform corresponding gesture at step 826.

The calibration processes of the first and second pointers to the first and second cameras are same as that disclosed above.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for touch detection, comprising:
   (a) a touch panel characterized with X-Y coordinates;
   (b) an imaging device associated with the touch panel and configured to acquire an image of the touch panel and transfer the acquired image into a signal array that is a function of an angle; and
   (c) a processor in communication with the imaging device for receiving the signal array therefrom, comparing a peak signal of the signal array with a predefined threshold and if the peak signal is greater than the predefined threshold, obtaining the peak's width, W, and angle, Θ, relative to the touch panel so as to determine the location (X, Y) of a pointer in the touch panel in the forms of:

$X=R\times\cos(\Theta)$, $Y=R\times\sin(\Theta)$, wherein R is a distance of the pointer and the imaging device, and satisfies the relationship of $W=A\times R^B+C$, wherein A, B and C are constant coefficients.

2. The apparatus of claim 1, wherein the pointer is calibrated to the imaging device by acquiring first, second and third images of the pointer touching the touch panel at first, second and third pre-selected locations, $R_1$, $R_2$ and $R_3$, respectively, to establish the relationships of:

$W_1=A\times R_1^B+C$, $W_2=A\times R_2^B+C$, $W_3=A\times R_3^B+C$, wherein $W_1$, $W_2$ and $W_3$ are the widths of the first, second and third images, respectively, and wherein the coefficients A, B and C are obtained by solving the equations.

3. The apparatus of claim 1, wherein the imaging device is mounted to the touch panel at a pre-selected mounting position such that the imaging device has a field of view encompassing the touch panel.

4. The apparatus of claim 3, further comprising a light source associated with the imaging device.

5. The apparatus of claim 4, further comprising a retro-reflector disposed on the periphery of the touch panel at a location that is opposite to the pre-selected mounting position so as to reflect light emitted from the light source backward to the image device.

6. The apparatus of claim 3, wherein the imaging device comprises a camera, CCD and/or CMOS.

7. The apparatus of claim 6, wherein the camera comprises an infra light emitting diode (LED) camera.

8. The apparatus of claim 1, wherein the imaging device is configured to acquire the image of the touch panel at a pre-determined frequency.

9. The apparatus of claim 1, wherein the processor comprises a computer.

10. A method for optically detecting a touch location in a touch panel, comprising the steps of:
  (a) providing an imaging device associated with the touch panel;
  (b) acquiring an image of the touch panel;
  (c) transferring the acquired image into a signal array that is a function of an angle;
  (d) comparing a peak signal of the signal array with a predefined threshold; and
  (e) if the peak signal is not greater than the predefined threshold, repeating steps (b)-(d), otherwise, obtaining the peak's width, W, and angle, Θ, relative to the touch panel so as to determine the location (X, Y) of a pointer in the touch panel in the forms of:

$X=R\times\cos(\Theta)$, $Y=R\times\sin(\Theta)$, wherein R is a distance of the pointer and the imaging device, and satisfies the relationship of $W=A\times R^B+C$, wherein A, B and C are constant coefficients.

11. The method of claim 10, further comprising the step of calibrating the pointer to the imaging device to obtain the coefficients A, B and C.

12. The method of claim 11, wherein the calibrating step comprises the steps of:
  (a) initializing a touch at a first pre-selected location, $R_1$, on the panel;
  (b) acquiring an image of the pointer touching the touch panel at the pre-selected location, wherein the acquired image is transferred into a signal array that is a function of an angle;
  (c) comparing a peak signal of the signal array with a predefined threshold;
  (d) if the peak signal is not greater than the predefined threshold, repeating steps (a)-(c), otherwise, obtaining the peak's width, $W_1$, and angle, $\Theta_1$, relative to the touch panel;
  (e) repeating steps (a)-(d) at the second and third pre-selected locations, $R_2$ and $R_3$ to obtain $W_2$ and $\Theta_2$, and $W_3$ and $\Theta_3$, respectively; and
  (f) solving the following equations:

$W_1=A\times R_1^B+C$, $W_2=A\times R_2^B+C$, and $W_3=A\times R_3^B+C$, to obtain the coefficients A, B and C.

13. The method of claim 10, wherein the imaging device is mounted to the touch panel at a pre-selected mounting position such that the imaging device has a field of view encompassing the touch panel.

14. The method of claim 13, wherein the pre-selected mounting position is located in the periphery of the touch panel.

15. The method of claim 14, further comprising the step of providing a light source associated with the imaging device.

16. The method of claim 15, further comprising the step of providing a retro-reflector disposed on the periphery of the touch panel at a location that is opposite to the pre-selected mounting position so as to reflect light emitted from the light source backward to the image device.

17. The method of claim 10, wherein the imaging device comprises a camera, CCD and/or CMOS.

18. The method of claim 17, wherein the camera comprises an infra light emitting diode (LED) camera.

19. The method of claim 10, wherein the acquiring step is performed at a predetermined frequency.

20. An apparatus for detecting touch locations of first and second pointers in a touch panel, comprising:
  (a) at least first and second imaging devices spatially mounted to the touch panel, each imaging device configured to acquire an image of the touch panel, and transfer the acquired image into a corresponding signal array that is a function of an angle; and
  (b) a processor in communication with each imaging device for receiving the corresponding signal arrays therefrom, comparing each peak signal of each signal array with a predefined threshold and if the peak signals are greater than the predefined threshold, obtaining the maximal widths, $W_1$ and $W_2$, and its corresponding angles, $\Theta_1$ and $\Theta_2$, of the signal arrays corresponding to the images captured by the first and second imaging devices, respectively, so as to determine touch locations (X1, Y1) and (X2, Y2) of first and second pointers, respectively, in the touch panel in the forms of:

$$X1 = R1 \times \cos(\Theta_1),$$

$$Y1 = R1 \times \sin(\Theta_1),$$

$$X2 = D - [R2 \times \cos(\Theta_2)],$$

$$Y2 = R2 \times \sin(\Theta_2),$$

wherein D is a distance between the first and second imaging devices, and wherein Rj is a distance between the j-th pointer and the j-th imaging device, j=1 and 2, and satisfies the relationship of $$W_j = A_j \times Rj^{Bj} + C_j,$$

wherein $A_j$, $B_j$ and $C_j$ are constant coefficients.

21. The apparatus of claim 20, wherein each of the first and second pointers is calibrated to the corresponding first and second imaging devices by acquiring first, second and third images of a printer touching the touch panel at first, second and third pre-selected locations, $R_1$, $R_2$ and $R_3$, respectively, to establish the relationships of:

$$W_1 = A_j \times R_1^{Bj} + C_j,$$

$$W_2 = A_j \times R_2^{Bj} + C_j,$$

$$W_3 = A_j \times R_3^{Bj} + C_j,$$

wherein $W_1$, $W_2$ and $W_3$ are the widths of the first, second and third images, respectively, and wherein the coefficients $A_j$, $B_j$ and $C_j$ are obtained by solving the equations, wherein j=1 for the first imaging device and j=2 for the second imaging device.

22. The apparatus of claim 21, wherein the first and second imaging devices are mounted to the touch panel at pre-selected first and second mounting positions, respectively, such that the first and second imaging devices have overlapping fields of view encompassing the touch panel.

23. The apparatus of claim 22, wherein the pre-selected first and second mounting positions are located in the periphery of the touch panel.

24. The apparatus of claim 23, further comprising first and second light sources associated with the first and second imaging devices, respectively.

25. The apparatus of claim 24, further comprising a retro-reflector disposed on the periphery of the touch panel at a location that is opposite to the pre-selected first and second mounting position so as to reflect light emitted from the first and second light sources backward to the first and second image devices, respectively.

26. The apparatus of claim 20, wherein each of the first and second imaging devices comprises a camera, CCD and/or CMOS.

27. The apparatus of claim 26, wherein the camera comprises an infra light emitting diode (LED) camera.

28. The apparatus of claim 20, wherein each imaging device is configured to acquire the image of the touch panel at a predetermined frequency.

29. The apparatus of claim 20, wherein the processor comprises a computer.

30. A method for optically detecting one or more touch locations in a touch panel, comprising the steps of:
(a) providing first and second imaging devices spatially mounted to the touch panel;
(b) acquiring a first image and a second image of the touch panel by the first and second imaging devices, respectively;
(c) transferring the acquired first image into a first signal array that is a function of an angle;
(d) comparing each peak signal of the first signal array with a predefined threshold;
(e) if the peak signal is greater than the predefined threshold, analyzing the peak number of the first signal array and obtaining the maximal width, Wj, and its corresponding angle, $\Theta$j;
(f) determining the location (Xj, Yj) of the first pointer in the touch panel in the forms of:

$$Xj = Rj \times \cos(\Theta_j),$$

$$Yj = Rj \times \sin(\Theta),$$

wherein Rj is a distance of the j-th pointer and the j-th imaging device and satisfies the relationship of $$Wj = A_j \times Rj^{Bj} + C_j,$$

wherein $A_j$, $B_j$ and $C_j$ are constant coefficients, wherein j=1;
(g) reporting the touch position of the first pointer; and
(h) repeating steps (c)-(g) for the acquired second image, wherein j=2.

31. The method of claim 30, further comprising the step of calibrating respectively the first and second pointers to the first and second imaging devices so as to obtain the coefficients $A_j$, $B_j$ and $C_j$.

32. The method of claim 30, wherein the first and second imaging devices are mounted to the touch panel at pre-selected first and second mounting positions, respectively, such that the first and second imaging devices have overlapping fields of view encompassing the touch panel.

33. The method of claim 32, wherein the pre-selected first and second mounting positions are located in the periphery of the touch panel.

34. The method of claim 33, further comprising the step of providing first and second light sources associated with the first and second imaging devices, respectively.

35. The method of claim 34, further comprising the step of providing a retro-reflector disposed on the periphery of the touch panel at a location that is opposite to the pre-selected first and second mounting position so as to reflect light emitted from the first and second light sources backward to the first and second image devices, respectively.

36. The method of claim 35, wherein each of the first and second imaging devices comprises a camera, CCD and/or CMOS.

37. The method of claim 36, wherein the camera comprises an infra light emitting diode (LED) camera.

38. The method of claim 30, wherein the acquiring step is performed at a predetermined frequency.

* * * * *